324-77
CROSS REFERENCE SEARCH ROOM

May 30, 1967 M. V. KALFAIAN 3,322,898

MEANS FOR INTERPRETING COMPLEX INFORMATION SUCH AS PHONETIC SOUNDS

Filed May 16, 1963 2 Sheets-Sheet 1

INVENTOR.

Megan V. Kalfaian

May 30, 1967 M. V. KALFAIAN 3,322,898
MEANS FOR INTERPRETING COMPLEX INFORMATION SUCH
AS PHONETIC SOUNDS
Filed May 16, 1963 2 Sheets-Sheet 2

INVENTOR.

Megan V. Kalfaian 3,322,898
MEANS FOR INTERPRETING COMPLEX INFORMATION SUCH AS PHONETIC SOUNDS
Meguer V. Kalfaian, 962 Hyperion Ave., Los Angeles, Calif. 90029
Filed May 16, 1963, Ser. No. 280,938
2 Claims. (Cl. 179—1)

Figure 1:
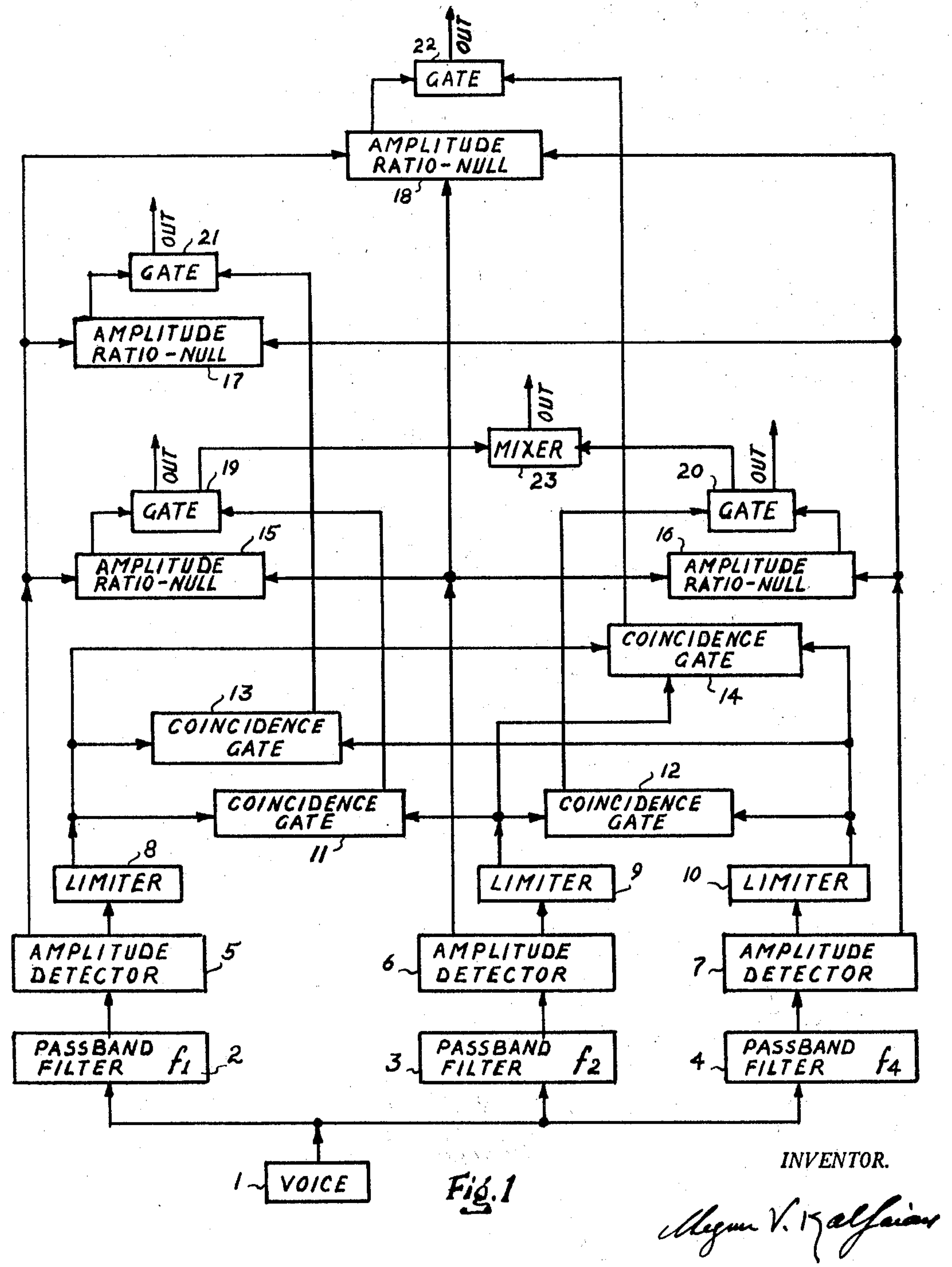

The present invention relates to complex information analysis, and more particularly to the provision of methods and means for the analysis of phonetic sound waves under different environmental conditions. The main object of the present invention is to provide a functional operation that closely simulates the interpretive mechanism of the human brain, so that analysis of spoken phonetic sounds by different speakers may be made as closely accurate as by the human brain.

In my previous patent issues, for example, U.S. Numbers 2,708,688, 2,921,133, 3,067,288, and my recent patent application on this subject, Ser. No. 274,511 filed Apr. 22, 1963, I had pointed out the various information carrying components in phonetic sounds that collectively define and distinguish between phonetic values and quality values of the spoken sounds. In order to implement the analysis of these phonetic values in spoken sounds, I had disclosed in these patents methods and means for first standardizing the widely varying positions of these components in the voice frequency spectrum, so that analysis of the said phonetic values could be made in a simpler mode than the unknown mysterious mode the human brain is capable of performing. Regardless of the differences in performances, however, the ultimate result obtained by any one of my methods or systems disclosed is the same, as my previous descriptions on the theory of phonetic sound recognition are not altered by the present disclosure, except that, the present disclosure contemplates understanding of the interpretive function of the brain closer than any so far offered from any source. The principal object of the present invention is, therefore, to provide a functional operation having close correlation between apparatus and human brain in interpreting conveyable information, for example, the spoken phonetic sounds. Thus, the true substance of the methods and means disclosed herein could not be fully grasped before describing what conveyable information actually represents, because this links the related arts, for example, translation of languages, and will lead to the understanding of the physical behavior of the brain for the ultimate possibility of thought (imagination) extraction from the brain, as I have discovered in my studies of the human brain. This may be explained as in the following:

*Constant values and variable values of information*

In describing the interpretive mechanism of the human brain, it must be first recognized that all conveyable interpretive informations have constant values, and all associated variables have characteristic quality values. For example, a thought has a constant value, but an added aplification thereto determines the characteristic quality of the thought. Similarly, all phonetic sounds have constant values, and all associated variables, including environments, have characteristic quality values. For example, a phonetic sound, as spoken by different speakers, both male and female, has a constant value (the same phoentic sound), but characteristically different in qualities, because of pitch, laryngeal, and environmental changes. The processes of recognizing a complete thought and a phonetic sound are analogous, and their basic principles cannot be separated. Since intelligence is required for interpretive analysis, then intelligence becomes a function of coordination between these constant values in terms of quantitative and qualitative values, wherein: the quantitative value is the number of constant values that can be related one with another; and the qualitative value is the precision with which these relations can be determined. Determination of these constant and variable values provides the basic principles for phonetic recognition.

*Interpretation of constant and variable values*

The first requirement for interpretive analysis is that, the information received from the original source must be complete. A second requirement is that, the brain must have in itself a storage of complete information consisting of basic component parts, and a determining mechanism to make sure that the received information is complete. For example, when one says "I went . . . ," the listener will not understand the meaning of the spoken sentence; firstly, because the spoken sentence is not complete, and secondly, because the determining mechanism of the listener's brain does not make sure that the received information is complete.

In analyzing the information contained in a sentence, the brain needs only to know if the basic component parts are present. For example: an action that has been started; the subject that has started it; and a reason for it. In the above given example, the brain recognizes the subject as being "I"; the action being "went"; but the reason is missing. Accordingly, it waits until a word representing reason arrives, for example, the word "skating." The arrival of this word is the basis of all intelligent interpretation, as it is at this very point that the brain recognizes the completeness of the information presented. This process is consistent whether the sentence is simple, complex, or compound. In all of these cases, the analytical process is completed at the end of a complete information, containing only the basic component parts "I went skating," even if the sequence of these words were mixed, and whether a series of assertions follow depending on a leading affirmation, or a series of affirmations follow dependent of each other. Here, it is not necessary to have a knowledge of grammar to have the sensation that the sentence is complete or not, as the very illiterate will also have exercised in due course of time the use of significant parts of a sentence, and how they relate one with respect to another, for intelligible understanding. By making comparison, then, a complete thought comprising only the basic component parts represents a constant value, because its interpretation is the same both to the educated and non-educated. Whereas, any addition to the constant value represents a variable or quality value, for example, by adding the word "yesterday" at the end of the sentence. When the sentence is made more complex, then only the educated is assumed capable of interpreting the variables. Thus, we must accept at this point that both constant values and quality values are selectable and detectable independently.

*Basic steps for selecting and interpreting the arriving information*

The basic mechanisms for information analysis, are: First, a permanent memory comprising singular on-or-off memories representing constant values (let's call them as compound memories), and intercoupled singular on-or-off memories representing basic component parts of the constant values (let's call them as simple, semi-complex and complex memories); second, a mechanism for temporarily storing the incoming information; third, a comparison mechanism between the permanent memories and temporary memories for comparative coincidence; fourth, an association mechanism for directing the comparison mechanism to relative areas of the permanent memory for coincidence; fifth, a sensation mechanism for cognizance of the information progressively from rudiment to complete thought, at the end of each coincidental comparison; and sixth, a sensation mechanism for cognizance of the information as arriving from an outside source. Thus in a simple example, assume first (in visual form) that the rudiments (letter symbols) of a received word are first recorded in the temporary storage in the form of simple coded signals. As the first representative letter symbol signal is recorded in the temporary recording mechanism, the association mechanism hunts and directs the comparison mechanism to the simple memory that represents that signal. When coincidence occurs at this point, the sensation mechanism causes the feeling that that letter symbol has been seen and recognized. When the second signal (representing the second letter symbol) is recorded, the previous process is repeated, but at the same time the ratio between these two signals is also coincided with a semi-complex memory that represents the combined two letter symbols. This process continues with coincidental comparisons between further semi-complex memories until at the end of a word, where the whole word is now represented as a complex memory. As mentioned previously, interpretation is not completed until the three words of the exemplary sentence have arrived. Thus when the second and third words arrive, a final comparative coincidence of signals is made with a compound memory representing the complete information "I went skating." As this compound memory is energized, the cognizance mechanism immediately produces the sensation that the arriving information has been seen and recognized.

The process of the analysis just mentioned can be reversed by the compound, complex, semi-complex and simple memories by a process of backward command, and vice versa, because memory cells can be regenerated for a long time after initial excitation. Thus it may be seen that an enormous number of complete informations (constant values represented by compound memories) can be recorded in the permanent storage for intelligible interpretation. The variable values are branched out solely dependent upon these constant values, for example, a whole musical score can be remembered by a singular constant value, branched out into a plurality of subconstant values, each of the latter values having dependent variable values, so that during the performance an enormous number of complex functions of the variables may be attained under automatic control of the upper constant values. The same condition also relates to the complex forms of visual images, wherein, groups of basic lines and curves are represented by singular memory cells; including shades, because there are no permanent intensity memories in the brain.

*Sound interpretation*

The process of sound interpretation is exactly similar to the above given basic process, even though the physical behavior of signal conversion inherently differs one from the other. For example, the rudiment of a sound is an eventful phenomena that represents motion. The time period from the inception to termination of this motion represents half the wavelength of a specific frequency. Thus in reference to the physiological aspects of the human brain, the sensory cells (hair cells) on the walls of the cochlea (in the ear) will each respond to a motion of particular frequency when fluid pressure at that frequency is induced across the cochlea (for more detail, see text on how the basilar membrane distributes shearing action to the hair cells, each representing a different frequency). The stimulus from any one, or a plurality of these cells are transmitted to the temporal lobe of the cerebrum cortex through the eighth cranial nerve, as a primary electrical excitation, from which point individual electrical impulses are conveyed to the surrounding matrix of memory cells for comparative coincidence. At the end of said primary excitation, a coincidental comparison is established, and sensation results of having recognized the sound. Thus for continuous sine wave, there is continuous sensation of having heard and recognized the sound, but 180 degrees lagging with respect to the original, because interpretation starts only after the eventful phenomena has taken place.

*Phonetic sound recognition*

In the foregoing it was indicated that all complete informations consist of constant values, and all quality values consist of variable values. This is exactly true for phonetic sounds, because a phonetic sound does not change no matter what quality of voice utters it, as long as the voice is intelligible. In order to validate this statement, let's first refer to the physical behaviors of the visual and auditory areas of the cerebrum cortex. In the exact circular area where fibers of the fifth cranial nerve connect, there are the same number of electro-responsive cells as the number of fibers in the nerve trunk. These cells differ in their physical structure from their surrounding cells, because the former ones are just electro-responsive cells, and the latter ones are permanent memory cells. The resolution time constants of these electro-responsive cells are very low, but uniform. Whereas, in the exact area where fibers of the eighth cranial nerve connect, there are also the same number of electro-responsive cells as the number of fibers in this nerve trunk, but of non-uniform responses. In the first case, the electro-responsive cells can be excited in steady states and they will remain active during the excitation period. Whereas in the second case, the electro-responsive cells cannot remain active in steady states, and fall into relaxation states. Each one of these cells has a different relaxation period, which stated otherwise, they act as frequency responsive cells covering the entire sound spectrum. Thus we may assume a screen of a plurality of resonant pass-filters, each becoming active only when energized at its resonant frequency.

With the above given conditions, assume that a phonetic sound is uttered to the ear. The various resonances of the sound are transmitted to the electro-responsive cells through the eighth cranial nerve. As described in the foregoing with regard to constant and variable values, here again constant and variable values are determined. Assigning numerical values to the electro-responsive cells, for example, number one to the cell resonating at the lowest frequency, the responded signals are transmitted in various intensities, and in different numerical positions, to the surrounding matrix of memory cells so that coincidence with the permanent memories may be established. Here, the constant value is represented by the combined numerical ratios between the lowest number present and a predetermined group of numbers, and between the intensity values of these selected numbers. Thus, a continuous coincidence is made between the ratios of the numerical positions of the lowest number and the higher numbers present, and the intensity ratios between these selected positions. Actually, phonetic sounds are recognized by the numerical ratio measurements between three said positions, but some simple vowels will have only two positions. For example, assume that the sound "a" as in "father" is represented by the combined ratio between the lowest selected numerical position and the twentieth multiplicant of this position, with a twenty-to-one intensity ratio between them. First, a comparative coincidence is made between the ratio value between the lowest numerical position present and its twentieth multiplicant with a first memory cell representing this value, and second, a comparative coincidence is made between the intensity ratio of the selected positions and a second memory cell. When these coincidental comparisons concur with a third memory cell, representative of the final constant value recognizing cell, then sensation is stimulated that the information has been interpreted. This process is also performed for the variable values, so as to determine the quality of the voice. Thus it is seen that the speaker's voice quality or pitch has no bearing upon recognition of the phonetic sound. As described in the foregoing, this process can be reversed to provide imagination. For example, assume that one is to imagine a familiar voice. The first action is to locate and excite the lowest numerical electro-responsive cell across the screen of the plurality of cells (representing the pitch of the voice), and then in the previous reverse order excite the various other cells both for constant values and variable values.

*Extraction of imaginative information*

As described in the foregoing, the resolution time constants of the electro-responsive cells of the visual area are uniform but very low. Whereas, the resolution time constants of the electro-responsive cells of the auditory area are high and non-uniform. These cells are energized in the same manner by either energies arriving from the eyes or ears, as when energized by imagination. The difference is that, both the ears and eyes transmit sensation signals through the fibers of their respective nerve trunks for cognizance of being with the outside world, or in contact with the received informations. This condition can be proven by an accidental experiment conducted by a boy named Pat Flanagan, who applied sound modulated radio frequency waves to the temples by insulated electrode pads, producing silent hearing. Even though it was considered as a mysterious phenomena, actually it confirms my above made statements. The RF energy between the two planar pads is merely to activate the electro-responsive cells of the auditory area (just in the same manner as a chamber of rare gas becomes ionized in the high frequency electric field), each responding to the modulation frequency of its resonance, as the high frequency RF filed just supplies the required energy. Since this energy would normally be transmitted through the eighth cranial nerve to the fiber tips connecting the sensation mechanism, then it is evident that there is no sensation of hearing from the outside world. (The memory cells are not affected by this RF, because they represent only coded signals.) This could also be applied to the visual area, but as stated, the electro-responsive cells in this area are non-selective. The important point here is that, the electro-responsive cells in both the visual and auditory areas are energized in the same manner whether the information is from outside or by imagination. The problem is, accordingly, to implement the extraction of the imagined thought.

*Extraction of thought*

According to the physical behavior of the brain, as described in the foregoing, a thought (imagination) provides two types of extractable informations. The first is a screen (the size of the cross sectional area of the fifth cranial nerve) of a plurality of static electrical informations for the visual area; and a screen (the size of the cross sectional area of the eighth cranial nerve) of a plurality of frequency selective electrical informations for the auditory area. The second is a coded low frequency electrical wave patterns (for either sound or vision) which represent composite coincidental comparisons between the electro-responsive cells and the permanent memory cells. The first type of electrical information may be extracted by a field, such as electric field, traversing the screen of electro-responsive cells, so that the individual electrical variations on these cells can modulate the traversing field for detection. The second type of electrical information may be extracted in several ways, which are simpler in instrumentation, but at present it requires much more knowledge than known to be able to decode the composite waveform.

Figure 2:
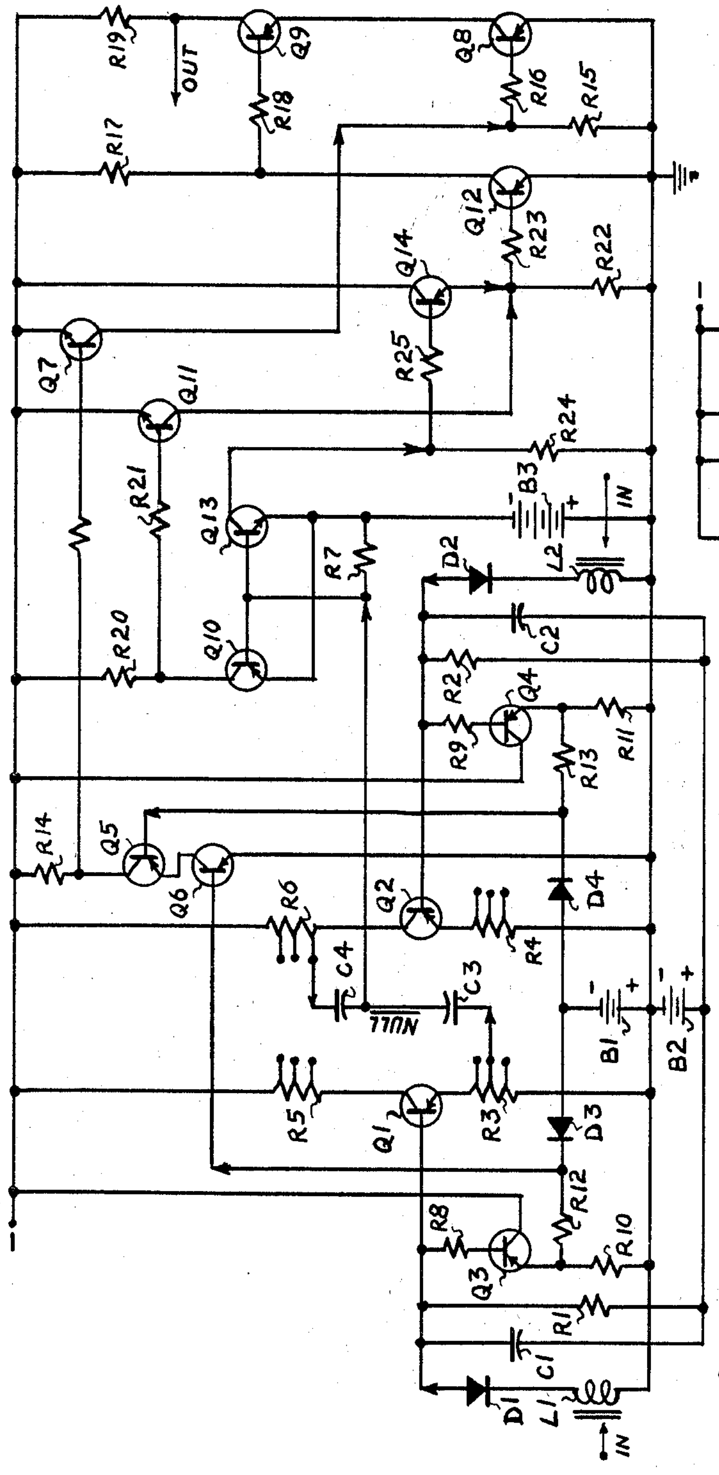
Figure 3:
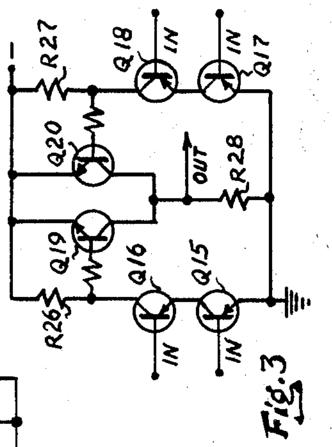

Having described a logical approach to simulating the interpretive mechanism of the human brain, reference is now made to the following specification of some exemplary arrangements for recognizing phonetic sounds, as spoken by all colors of voices, in conjunction with the accompanying drawings, wherein: FIG. 1 is a block diagram of an exemplary system in accordance with the invention; FIG. 2 is a schematic detail of the block diagram; and FIG. 3 is a mixer circuit to be used in conjunction wth the circuit of FIG. 2.

*Block diagram arrangement*

Referring now to the block diagram in FIG. 1, the original voice signals in block 1 are applied in parallel to a plurality of bandpass filters, of which only three are shown, as designated in blocks 2, 3 and 4 at frequencies $f_1$, $f_2$ and $f_4$. Since the pass bands of these filters will be arranged in sequential order, for example commencing 60 cycles per second for the lowest pitched voice to 600 cycles per second for the highest pitch in average speech, and harmonics, thereof, we may assume that the lowest resonant frequency (pitch) of any group of frequencies representing a phonetic sound may be positioned anywhere between 60 to 600 cycles per second. As explained in the foregoing, selection of various resonances in phonetic sound is done by measuring their frequency ratios with respect to the lowest (pitch) frequency present (instrumentationwise, these measurements may be done in different modes when so desired). Since these pitch frequencies vary approximately from 60 to 600 cycles per second, then said measurement must be done in continuum of steps, as accomplished by the human brain. For practical purposes, however, fewer numbers of such measurements may be made with satisfactory results, and the pass bands of the filters may be much wider than the individual sensory cells on the walls of the cochlea. For example, a maximum number of 32 filters will divide the entire spectrum band (in pass bands of increasing widths) of speech sound frequencies (60 c.p.s. to 7000 c.p.s.) in contiguous steps without causing crowded resonances passing through the filters at a time for any phonetic sound, although their frequency positions will vary within the pass bands of the filters. Thus by assigning numerically increasing positions to the bandpass filters in blocks 2, 3 and 4, for example, block 2 being in the first position, block 3 being in the second position, and block 4 being in the fourth position (the block for frequency $f_3$ is not shown to avoid crowding of the drawing), we may obtain coincidental matching between any two or more of these numerical positions by composite coupling means. For example, by first amplitude detecting the outputs of blocks 2 through 4, in blocks 5 through 7, and amplitude limiting these detected signals in limiter blocks 8 through 10, respectively, we may intercouple the outputs of limiters in blocks 8 through 10 in a series of numerical steps for coincidental matching by the gates in blocks 11 through 14. When the lowest frequency of the incoming sound is in the first position, and has a second harmonic located in the second position, the gate 11 (gates 11 through 13 having first and second inputs are normally in idle states, and become operative only when simultaneous forward signals are applied to the first and second inputs) will become operative by the simultaneous signals arriving from limiters 8 and 9. Similarly, when the lowest frequency of the incoming sound is in the second position, and has a second harmonic located in the fourth position, the gate 12 will become operative by the simultaneous signals arriving from limiters 9 and 10. Thus, it is seen that any of these fixed ratios located in different numerical positions may be obtained by a sequence of coupling means fanned out from each of these numerical positions, for example, gate 11 being coupled between the first and second positions, and gate 13 being coupled between the first and fourth positions; this continuing to the *n*th position. This could also be extended to combinations of three or more positions, for example, as shown, by the gate in block 14 coupled between the first, second and fourth positions. Thus it is seen that the ratios between frequency positions of various sound-components with respect to the lowest frequency present can be detected by the gates 11 through 14, inclusive. The amplitude ratios between these detected frequency components, either with respect to each other, or with respect to the amplitude of the lowest frequency component present, may be detected by auxiliary coupling means, as in the following:

Due to the on-or-off operating states of coincidence gates in blocks 11 through 14, the outputs of amplitude detectors in blocks 5 through 7 have been passed through the amplitude limiters 8 through 10 prior to application upon the said gates. For amplitude ratio detection, however, the blocks 15 through 18 are impressed upon directly by the outputs of the detectors in blocks 5 through 7 and the amplitudes of these applied signals are so proportioned that an output null is obtained from any of the blocks 15 through 18 when resonances in the original sound that cause these signals have predetermined amplitude ratios with respect to each other. The coupling arrangement of the amplitude ratio null devices in blocks 15 through 18 is exactly the same as the coupling arrangement of the gates 11 through 14, so that signal amplitude ratio measurement between any two positions is made only when the coacting gates 11 through 14 are simultaneously active.

The outputs of ratio-null indicating devices in blocks 15 through 18 are applied to the first inputs of gate circuits in blocks 19 through 22, respectively. These gates have first and second inputs of which the first inputs are normally forward biased and the second inputs are normally backward biased. The outputs of null indicating devices in blocks 15 through 18 are applied to the first inputs of gates 19 through 22 in backward directions, so that any impression of backward signals from those devices render the respective gates inoperative when simultaneous forward signals are applied upon their second inputs. Whereas, a null output signal from any of blocks 15 through 18 will render the respective gate operative by simultaneous forward signal upon the second input. With these operating conditions the outputs of coincidence gates in blocks 11 through 14 are applied to the second inputs of gates 19 through 22, respectively, in forward directions. Thus during the presence of any combination of signals, as applied simultaneously upon the coincidence gates, the amplitude ratios of these signals are also measured by the null indicating devices. When any of these amplitude ratios balance out as null at the output of any of the respective gates, then that gate will operate with the indication that a particular combination of signals having predetermined signal-amplitude ratios with respect to each other have been present and selected. For example, assume that during a given period of time there have been simultaneous output signals from filters in blocks 2, 3 and 4, but information is carried by the outputs of only blocks 2 and 3. Because of these simultaneous signals, the coincidence gates 11 through 14 will all be in operating conditions, and apply forward signals to the second inputs of gates 19 through 22, respectively. As just assumed, only the outputs of blocks 2 and 3 represent information, and accordingly, the output of ratio-null device in block 15 will apply zero, or below threshold, signal upon the first input of gate 19, while the outputs of null indicating devices in blocks 16 through 18 will apply backward signals upon the second inputs of gates 20 through 22. Thus, the gates 20 through 22 will remain in their normal non-operative states, even though their second inputs are excited by forward signals, and gate 19 will operate because the normal forward bias upon its first input is not disturbed by the applied null signal. The operating state of gate 19 is then interpreted as the information in the original sound in block 1. As described in the foregoing, the lowest residing frequency (pitch) in speech sound waves may shift anywhere between 60 to 600 cycles per second. Thus, the same information just mentioned, as represented between the outputs of pass band filters in blocks 2 and 3, may be represented between the outputs of filters 3 and 4, when the lowest residing frequency is at the output of block 3 instead of being at the output of block 2. In this case, the gate in block 21 will operate instead of gate 19, representing the same information. For this reason, we may include a mixer circuit, such as shown by the block 23, so that the output of this mixer will represent the same information whether the gate 19 or 21 operates. Of course, this mixer could be arranged for more than two signals, and besides, the more complex coincidence gate in block 14 and ratio-null indicator in block 18 may be replaced by mixer circuits for reducing the number of component parts in the arrangement, as given.

*Schematic detail*

Referring now to the detailed schematic arrangement in FIG. 2, the amplitude detectors for the outputs of band-pass filters (in FIG. 1) consist of the usual rectifier diodes and capacitors shunted by resistor elements, such for example, diode D1 connected in series with capacitor C1 shunted by resistor R1 for the first channel, and diode D2 connected in series with capacitor C2 shunted by resistor R2 for the second channel. These detecting networks are driven by the output impedance L1 for the first channel, and the output impedance L2 for the second channel. The ground return circuits of these detecting networks are connected in series with a normal forward bias voltage of source B1, for the reason that presently available diodes, especially silicon diodes, do not start conducting from zero voltage, and therefore result in loss of the incoming signals having very low amplitudes. This loss could be made negligible, however, by amplifying the signals in L1 and L2 to high magnitudes. The detected signals across C1 and C2 are applied upon the base electrodes of transistors Q1 and Q2, respectively. These transistors are used as both emitter followers and phase inverters by the emitter circuit resistors R3, R4, and collector circuit resistors R5, R6, respectively. Since the inputs of Q1 and Q2 are from two separate channels, for null indication, negative and positive voltages are balanced out from across resistors R3 and R6 by coupling capacitors C3 and C4 upon load resistor R7. As shown in the drawing, the resistors R3 through R6 are tapped for various voltage divisions, so that the capacitors C3 and C4 may be connected to predetermined taps in order to obtain null signal when the incoming signals upon Q1 and Q2 have the prescribed amplitude ratios with respect to each other. Thus, it is assumed at this point, as an example, that the inputs of Q1 and Q2 are simultaneously active, and that a null signal is obtained across the load resistor R7. The object of this null signal in conjunction with the simultaneous signals at the inputs of Q1 and Q2 is to cause an output signal representative of some information, which is accomplished as in the following:

The detected signals across C1 and C2 are applied to the base electrodes of normally idle gate transistors Q3 and Q4, in forward directions, through current limiting resistors R8 and R9, respectively. The emitter circuit resistors R10 and R11 of Q3 and Q4 are coupled to the base electrodes of gate circuit transistors Q5 and Q6, in series with voltage limiting resistors R12 and R13, respectively. The active voltages developed across R10 and R11 are limited in amplitudes to a fixed voltage of bias B2 by diodes D3 and D4 connected respectively from the base electrodes of gate transistors Q5 and Q6 in series with B2 to ground. Thus when the active voltages across R10 and R11 reach above the voltage of B2, current pass through diodes D3, D4, and the increasing voltages across R12 and R13 drop to the limiting value; this limiting action, of course, being for safe operation of the transistors, and not as a functional necessity. When these simultaneous signals are applied upon the base electrodes of gate transistors Q5 and Q6, they become conductive and pass current through the collector circuit resistor R14, which in turn develops a forward bias upon the base electrode of normally idle gate transistor Q7 for conductance, and further, the voltage developed across collector circuit resistor R15 of Q7 is impressed as a forward bias upon the base electrode of normally idle gate transistor Q8, in series with the current limiting resistor R16, for final conductance. This final conductance of gate transistor Q8 is established in series with gate transistor Q9 receiving a normal forward bias upon its base electrode in series with resistor R17 and current limiting resistor R18. When the series connected gate transistors Q8 and Q9 start conducting, current flows through the collector circuit resistor R19 and the voltage developed across this resistor is transmitted to an outgoing channel as interpretation of the information contained in the original sound wave. In the case that during operation of the gate transistors Q5 and Q6 the signal across load resistor is not null, then the output gate circuit comprising transistors Q8 and Q9 is prevented from operation, in the following manner:

When the unbalanced signal voltage across load resistor R7 is in negative polarity, it applies a forward bias upon the base electrode of normally idle PNP transistor Q10 for conductance, and thereby produce a positive voltage across the collector circuit resistor R20. This positive voltage is applied to the base electrode of normally idle transistor Q11, in series with current limiting resistor R21, for conductance, and thereby produce a negative voltage across collector circuit resistor R22. Finally, the negative voltage across R22 impresses a forward bias upon the base electrode of normally idle transistor Q12, in series with current limiting resistor R23, for conductance, which pulls the high negative voltage across R17 to close to ground potential, and thereby prevent operation of the series connected gate transistors Q8 and Q9, by removing the normal forward bias upon the base electrode of Q9. Similarly, when the unbalanced potential across output load resistor R7 is in positive polarity, it is impressed upon the base electrode of normally idle NPN transistor Q13 as a forward bias for conductance. The collector circuit resistor R24 of Q13 is connected to ground, and the collector supply voltage is received from source B3. When Q13 starts conducting, a negative voltage is developed across R24, which is impressed as forward bias upon the base electrode of normally idle transistor Q14, in series with current limiting resistor R25, for conductance. The conductance of Q14 produces a forward bias upon the base electrode of normally idle transistor Q12, so that this transistor prevents operation of the series connected gate transistors Q8 and Q9, in the same fashion as accomplished when the unbalanced signal across R7 were in negative polarity. Thus it is seen that any unbalance signal across resistor R7, whether it be in positive or negative polarity, will prevent operation of the series connected gate transistors Q8 and Q9, even though a forward bias is impressed upon the base of Q8.

In FIG. 2, it was stated that the transistors Q7, Q8, and Q10 through Q14 are normally arranged to be in idle states, and yet no cut-off biases are shown for these transistors. While cut-off biases may be used, the circuit arrangement as shown will operate satisfactorily, as silicon transistors have high collector impedances with zero biases upon their base electrodes. It may also be desirable that the number of transistors, as used in this arrangement, be reduced for economy, by using capacitive coupling instead of the direct coupling, as shown, for the phase inverting stages.

According to the foregoing description, by way of the block diagram in FIG. 1, a mixer circuit is desirable at the final gates comprising transistors Q8 and Q9. Such a mixer circuit, although conventional, is shown in FIG. 3, wherein, the gate transistors Q15 and Q16 represent the gate transistors Q8 and Q9, respectively, and gate transistors Q17 and Q18 represent similar gates of a second similar channel. The output voltages across collector circuit resistors R26 and R27 are then applied upon the base electrodes of mixer transistors Q19 and Q20, in forward biases, so that any of the operating signals across R26 or R27 will appear across the common output resistor R28 as final interpretive operation.

With the exemplary arrangements shown in FIG. 1 through FIG. 3, it becomes obvious to those skilled in the art that these arrangements are only limitations for the main purpose involved herein, as various substitutions of parts, modifications, and adaptations may be made with departing from the true spirit and scope of the invention. For example, the coincidence gates 11 through 14 in FIG. 1 may be of the null indicating type, and changed into active signals by an arrangement as shown in FIG. 2. Similarly, when such null indicating devices are substituted for the blocks 11 through 14, these devices may receive their signals from frequency detectors instead of amplitude detectors, so that null indication may be more accurate with regard to frequency positions of the signals at the outputs of passband filters in blocks 2 through 4. Finally, and for practical purposes, satisfactory results may be obtained by using only 16 passband filters, at the following sequence of center frequencies: 85; 105; 165; 255; 347; 448; 560; 730; 960; 1300; 1700; 2300; 3000; 3900; 5400; 7350 cycles per second.

What I claim is:

1. In complex combination of numeric order where identifiable information is represented by a group of simultaneously occurring component parts having certain numeric ratio relations with respect to the component part of the lowest numeric order and having in conjunction certain quantity ratio relations with respect to the quantity of the component part having the lowest numeric order, the system of identifying said information comprising the following: A source of said complex combination having component parts of information bearing quantities arranged is positions of certain numerical ratio with respect to each other; means for selecting a group of component parts from said source, having certain numerical relations with respect to the selected part located in the lowest numerical position; means for measuring the quantity ratios of the selected group with respect to the part located in the lowest numerical position to determine if such measured ratios agree with predetermined ratios of said identifiable information; and means for translating the agreed ratio measurements into an identifiable signal of the information aforesaid.

2. The system as set forth in claim 1, wherein is included an array of signal responsive means arranged in numerical sequence; a first matrix arrangement of normally idle first gates coupled between said array of means, said gates becoming operative individually only when signals arriving through said coupling means from their respective said signal responsive means are simultaneous; a second matrix arrangement of null indicating means coupled between said array of signal responsive means in respective order as of said first matrix; a normally idle second gate coupled between each of said first gates and said null indicating means, respectively, said second gates becoming operative individually only with simultaneously coincidence of signal from said first gates and null from said null indicating means, respectively, so that operation of any of said second gates will determine the presence of said information; and means for transforming the operation of any of said second gates into analytic operation as identification of the information aforesaid.

References Cited

UNITED STATES PATENTS

| | | | |
|---|---|---|---|
| 2,458,227 | 1/1949 | Vermeulen et al. | 179—1 |
| 2,708,688 | 5/1955 | Kalfaian | 178—31 |
| 3,215,934 | 11/1965 | Sallen | 324—77 |

KATHLEEN H. CLAFFY, *Primary Examiner.*

R. MURRAY, *Assistant Examiner.*